May 11, 1965 R. H. GRAY 3,182,962
WINCH BRAKE
Filed June 8, 1962
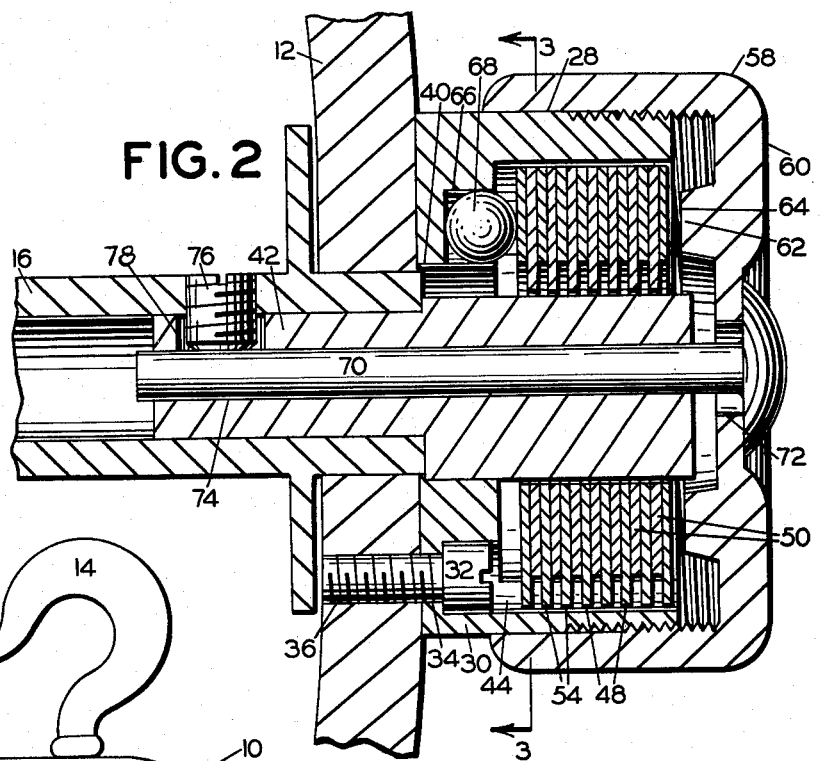
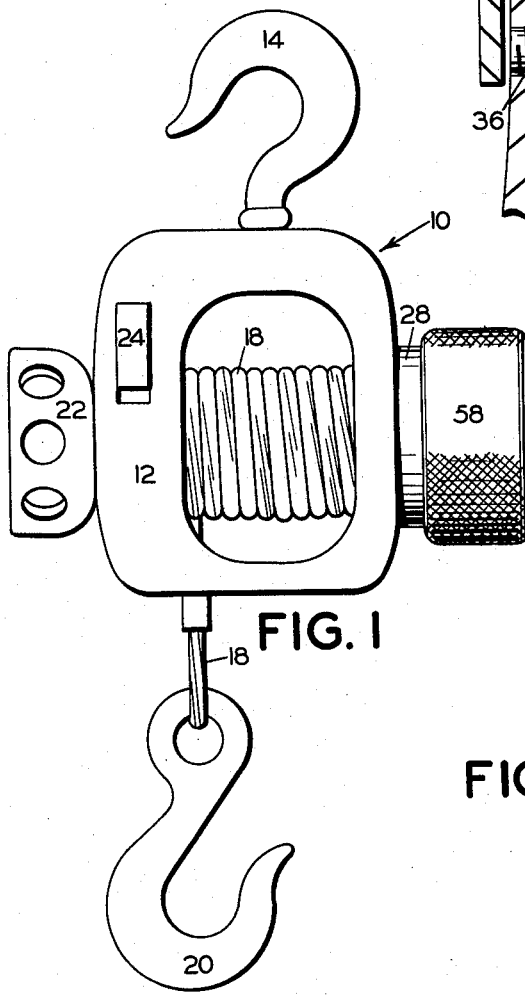
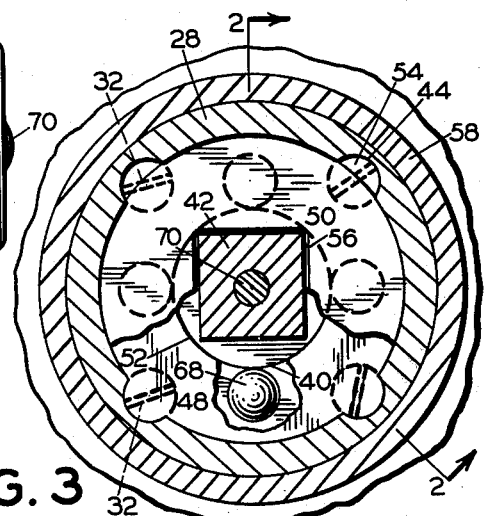
INVENTOR.
ROBERT H. GRAY
BY Eugene M. Eckelman
ATTORNEY United States Patent Office 3,182,962
Patented May 11, 1965

3,182,962
WINCH BRAKE
Robert H. Gray, Portland, Oreg., assignor, by mesne assignments, to Preferred Growth Capital, Inc., a corporation of Oregon
Filed June 8, 1962, Ser. No. 201,195
1 Claim. (Cl. 254—186)

This invention relates to a new and useful winch brake mechanism.

A primary object of the present invention is to provide a novel brake mechanism for a winch, and more particularly is concerned with a brake mechanism particularly suited for a hand type winch.

Another object is to provide a brake mechanism of the type described designed to provide the operator with a simple yet efficient method of controlling the unwinding of a cable from the winch drum as required when releasing a load.

Another object is to provide a brake mechanism for a winch designed for novel adaptation to said winch.

Still another object is to provide a brake mechanism for a winch employing a novel arrangement of brake friction means and novel operative association thereof with the winch drum.

Yet another object is to provide a brake mechanism of the type described having novel means accomplishing a smooth braking function and one accomplishing a wide variance in said braking function to perform a gradual or if desired a substantially instant release of the winch drum.

Other objects are to provide a brake mechanism for a winch which consumes a minimum of space as applied to the winch, which is rugged in structure, and which is inexpensive to manufacture.

Briefly stated, the present invention is embodied in brake mechanism which is designed particularly for association with a hand winch having a housing and a winch drum rotatably mounted in the housing and adapted for winding a load binding element such as a cable thereon. The brake mechanism employs a housing adapted for integral attachment to the winch housing and a brake driver or shaft rotatable with the drum and projecting through the brake housing. The driver supports a plurality of disc brake elements in non-rotative relation therewith which are alternately associated with other disc brake elements having non-rotative association with the brake housing. A brake actuating cap member is threadedly mounted on the brake housing and is adapted to apply a braking pressure to the brake discs and thus resist rotation of the driver and consequently the winch drum. The brake mechanism employs novel means providing for shockless braking.

The invention will be better understood and additional objects will become apparent from the following specification and claim, considered together with the accompanying drawings, wherein the numerals of reference indicate like parts and wherein:

FIGURE 1 is a side elevational view of a hand winch showing the present brake mechanism applied thereto;

FIGURE 2 is an enlarged, longitudinal, sectional view of the present brake mechanism, taken on the line 2—2 of FIGURE 3, a fragmentary portion of the winch to which the brake is applied being shown; and FIGURE 3 is a transverse sectional view of the brake mechanism, taken on the line 3—3 of FIGURE 2.

With particular reference now to the drawings, the present brake mechanism is particularly applicable for association with a hand-type winch 10 having a housing 12, an anchoring hook 14 attached to the housing, a hollow winding shaft or drum 16 journaled in the housing for winding a cable 18 or the like thereon, a hook 20 on the free end of the cable, an apertured lever operated drum 22 secured to one end of the winding shaft 16 for rotating the shaft, and winding shaft control means 24 which may be in the form of a pawl associated with a ratchet wheel, not shown, on the winding shaft to provide one-way winding of the latter and release when desired.

Referring now particularly to FIGURES 2 and 3, the present brake mechanism employs a housing 28 having an end wall 30, the inward surface of which is of suitable contour to abut against an end wall of the winch housing for securement thereagainst. Brake housing 28 is tubular in construction and is secured to the winch housing by screws 32 extending through counterbored apertures 34 in the end wall 30 and threadedly engaged in tapped bores 36 provided in the brake housing.

End wall 30 of the brake housing has a central aperture 40 for receiving a stepped driver or core member 42 having a reduced end which projects into hollow winch drum 16 and an enlarged end which projects into the tubular brake housing 28. Driver 42 is rectangular in cross section, and the aperture 40 in end wall 30 is circular and sufficiently large to permit rotation of such driver therein.

A drive connection is necessary between winch drum 16 and driver 42 and for this purpose the interior of the drum preferably also is rectangular and sized to non-rotatably receive the driver. It is to be understood, however, that the driver may assume a circular shape and other means employed to secure it to the drum.

The interior surface of the tubular housing 28 is provided with longitudinal grooves 44 which extend between the end wall 30 and the outer end of the housing. Preferably, for purposes of construction, the grooves 44 lead from the counterbored portions of screw apertures 34.

Contained within the housing 28 are two sets of disc brake elements 48 and 50 disposed in alternate relation. Disc elements 48 are provided with a circular central aperture 52 slightly larger than the greatest cross sectional dimension of the driver 42 for rotative relationship therewith but are provided with tabs or spline portions 54 which engage in grooves 44 to hold such brake elements in non-rotative relationship with the housing. Disc elements 50 have a rectangular central opening 56 for mounting thereof in a non-rotative relation on driver 42. The disc elements 50 rotate freely relative to the housing 28. By this arrangement, alternate discs are connected to the housing 28 and driver 42, and when such discs are not compressed free rotation of the driver is permitted relative to the housing 28. Upon pressure association of the discs a braking function is applied to said driver.

The braking pressure is applied by a knurled brake actuating cap or thrust member 58 threadedly engaged with housing 28 and having an end wall 60. The inner surface of end wall 60 is provided with an annular projection 62 having a flat end surface 64. It is apparent that upon inward threaded movement of the cap 58, the disc brake elements are squeezed together in a friction braking function to develop a frictional resistance to the rotation of the driver and winch drum.

In a preferred construction, the end wall 30 of housing 28 incorporates, in suitable pockets 66, a plurality of resilient balls 68 which have a diameter greater than the depth of pockets 66 so as to project a substantial distance out of them. Balls 68 are engaged by the innermost disc brake element 48 and accomplish smooth braking functions as well as a wide variance in said braking functions to perform a gradual or if desired a substantially fast release of the winch drum.

Associated with the cap 58 is a headed limit pin 70 the shank of which passes freely through an aperture 72 in the end wall 60 of the cap and through the bore 74 in driver 42. Drum 16 threadedly receives a set screw 76 which passes freely through a radial aperture 78 in the driver 42 and engages pin 70 for locking it in a selected position with relation to the driver. Pin 70 serves to limit the release rotation of cap 58 in order that the latter cannot accidentally be fully removed from the housing 28. Thus, the pin is anchored in a selected position by set screw 76 such that the cap 58 is freely operable to perform its braking and release functions but positioned to prevent complete unthreading of said cap.

The operation of the present winch is as follows: During winding operation thereof, the cap 58 is retracted sufficiently to permit friction free, relative rotation of the disc brake elements 48 and 50 whereby driver 42 operates freely with the winch drum. After the cable 18 has been wound on the drum in a loading function and when it is desired to release the load pressure thereof in a controlled manner, the cap 58 is first tightened to an extent to compress the brake disc elements for locking the driver 42 and winch drum against rotation. Prior to locking the brake, however, the pawl 24 of the winch is released from its ratchet wheel and either held in released condition by the operator or if it is of the type which manually can be set in a released position, it is first thusly set. It is understood, however, that in releasing the pawl, the pressure of the load must be released therefrom by rotating the lever actuated drum 22 slightly in a load binding direction.

Thereupon, the brake can be released to accomplish the desired release speed of the load, either very gradually by slow unthreading of the cap 58 or more rapidly by a faster unthreading thereof. A release function can also be halted when desired by re-tightening the cap.

Resilient balls 68 serve the important function of cushioning the pressure exerted on the discs in order that shock braking of metal to metal parts does not result. Instead, these balls cause a smooth and non-shock braking and are effective in accomplishing a wide variance in the amount of friction developed, from a small amount necessary merely to slow down release of a load to a maximum amount wherein the driver 42 is securely locked, or any intermediary friction gripping. On an extremely heavy braking, the balls 68 may be compressed entirely into their pockets wherein a rigid metal to metal locking relation is established between the inner face of end wall 30 and the innermost disc brake element.

The present brake is compact in its structure and thus does not interfere with operations of the winch. In this same regard, it has no sharp projections or other protruding parts which can hang up on devices in the area in which the winch is used.

It is to be understood that the form of my invention herein shown and described is to be taken as a preferred example of the same and that various changes in the shape, size and arrangement of parts may be resorted to without departing from the spirit of the invention or the scope of the subjoined claim.

Having thus described my invention, I claim:

A winch structure in combination with an attachable brake comprising a housing having end walls with outer surfaces, a winding shaft journaled in said housing having one end projecting through one of said end walls of the housing, shaft winding means on said projecting end, ratchet and pawl means on said winding shaft and housing arranged to provide ratchet winding of said shaft, the other end of said winding shaft projecting through the other of said housing end walls and terminating substantially flush with the outer surface of said latter end wall, said latter end of the winding shaft being hollow, a brake driver shaft attachably secured in the hollow end of said winding shaft and projecting outwardly through said other end wall of the housing, said brake driver shaft being rotatable with said winding shaft, a brake housing attachably secured to said winch housing and confining a projecting portion of said winding shaft, an inner wall in said brake housing, first brake disc means splined on the projecting portion of said brake driver shaft, second disc brake means splined to said brake housing in face to face relation with said first disc brake means, and a brake actuating cap threadedly mounted on said brake housing for adjustable movement toward and away from the inner wall of the brake housing, said brake actuating cap having an end wall portion arranged for engageably compressing said first and second disc brake means together to apply braking forces on said brake driver shaft for controlled unwinding of the winding shaft.

References Cited by the Examiner
UNITED STATES PATENTS

| | | | |
|---|---|---|---|
| 75,227 | 3/68 | Weston | 188—72 X |
| 1,125,107 | 1/15 | Jacques | 188—82.7 |
| 2,080,900 | 5/37 | Shakespeare | 188—72 X |
| 2,285,493 | 6/42 | Clickner | 242—84.5 |
| 2,527,871 | 10/50 | Bakewell | 188—68 |
| 2,596,318 | 5/52 | Willi et al. | 188—72 X |
| 2,760,736 | 8/56 | Mihalko et al. | 188—71 X |
| 2,819,063 | 1/58 | Neidhart | 267—63 |
| 3,028,619 | 4/62 | Schlage et al. | 188—72 X |
| 3,072,220 | 1/63 | Bernson et al. | 188—72 |

ARTHUR L. LA POINT, *Primary Examiner.*

EUGENE G. BOTZ, *Examiner.*